United States Patent [19]
Oxley et al.

[11] 3,791,182
[45] Feb. 12, 1974

[54] STEERING COLUMN LOCKING DEVICE

[75] Inventors: Gerald K. Oxley; Mahendrakumar B. Shah, both of Lafayette, Ind.

[73] Assignee: TRW Inc., Cleveland, Ohio

[22] Filed: May 18, 1972

[21] Appl. No.: 254,382

[52] U.S. Cl. .................................................. 70/252
[51] Int. Cl. ........................ B60r 25/02, B60r 25/04
[58] Field of Search .............. 70/181, 186, 239, 252

[56] References Cited
UNITED STATES PATENTS

| | | | |
|---|---|---|---|
| 3,575,023 | 4/1971 | Shimizu | 70/252 |
| 3,490,255 | 1/1970 | Wight et al. | 70/252 |
| 1,838,891 | 12/1931 | Van Sickel | 70/252 |

Primary Examiner—Marvin A. Champion
Assistant Examiner—Richard P. Tremblay
Attorney, Agent, or Firm—Hill, Sherman, Meroni, Gross & Simpson

[57] ABSTRACT

Ignition and steering column lock for motor vehicles operated by a key controlling both the ignition switch and steering column locking element. The lock comprises a bolt biased by a spring to engage a keeper hole in a sleeve secured to the steering column. The bolt is withdrawn by a cam operated by turning movement of the key and key cylinder. The ignition switch is operated by a rod rectilinearly moved by turning movement of the key cylinder through a rack and pinion connection. A blocking plunger is guided in the lock housing to block movement of the rod and key cylinder when moving in a direction to lock the steering column. The plunger is depressible by the operator to free movement of the rod to accommodate movement of the key cylinder to effect locking of the steering column.

1 Claim, 9 Drawing Figures

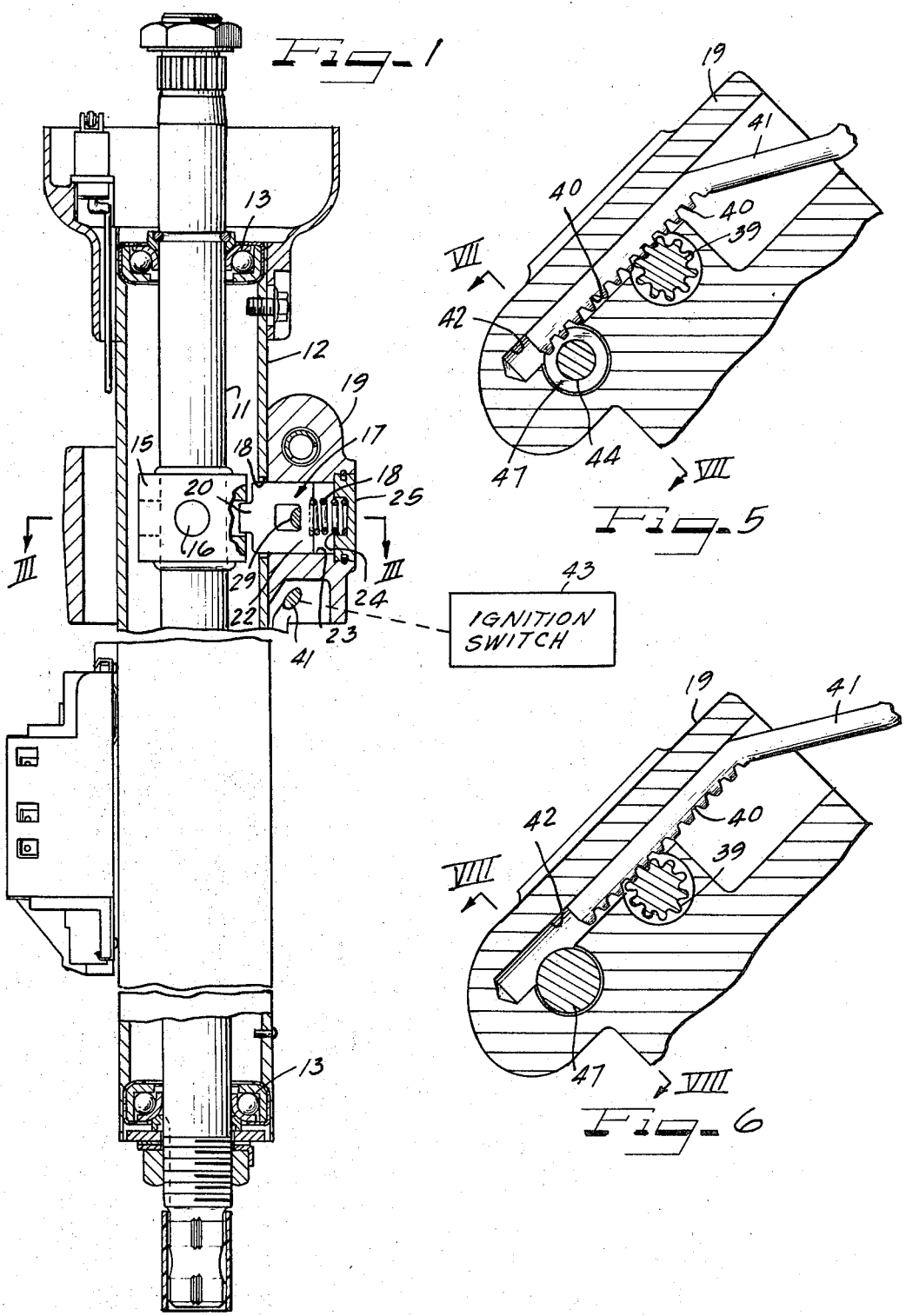

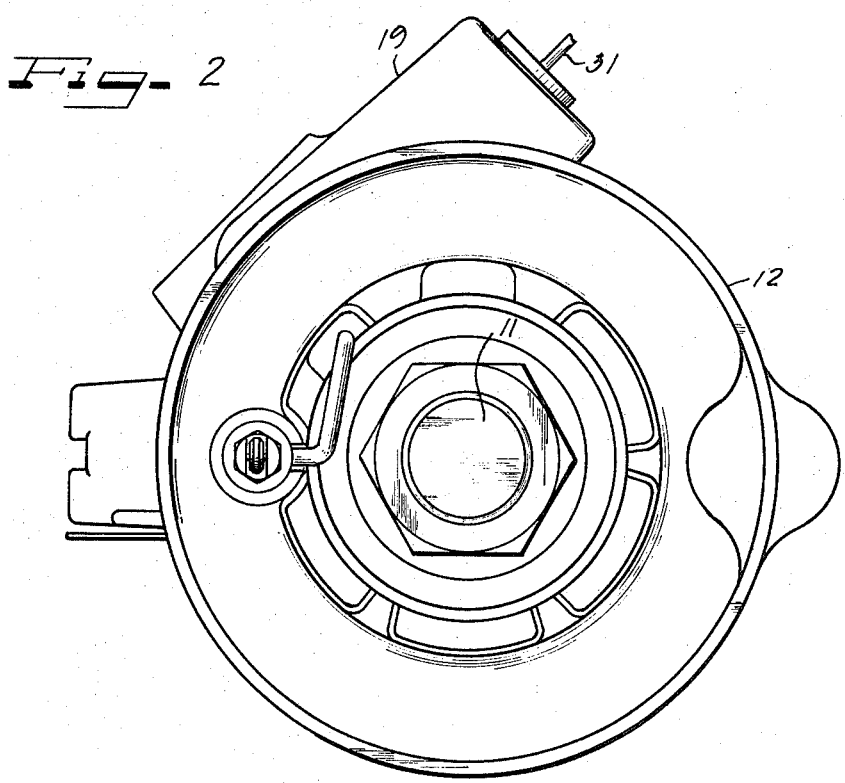
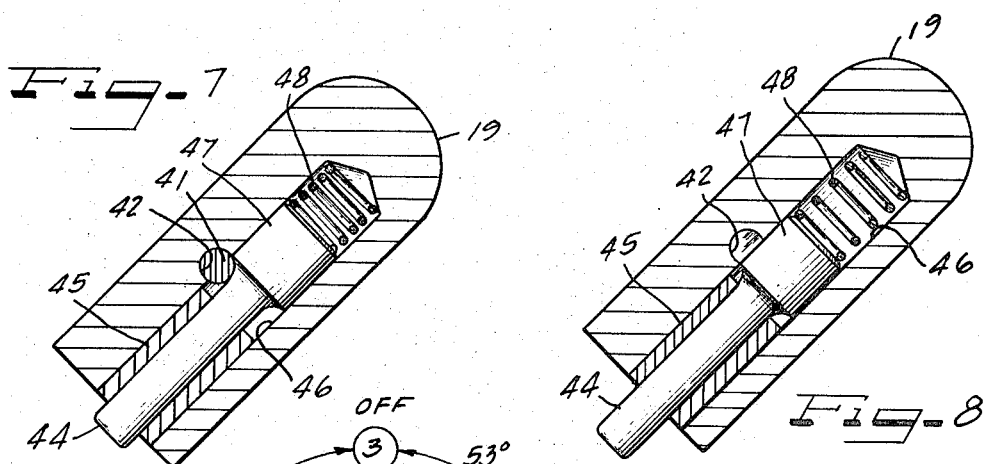
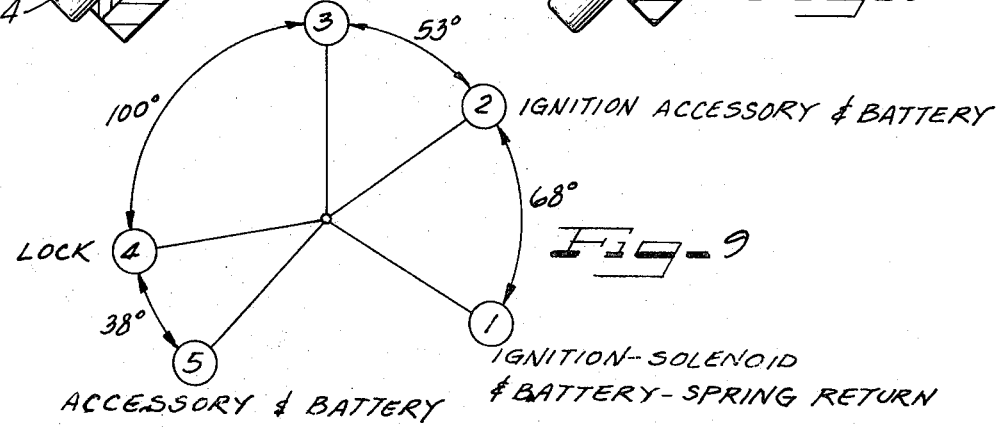

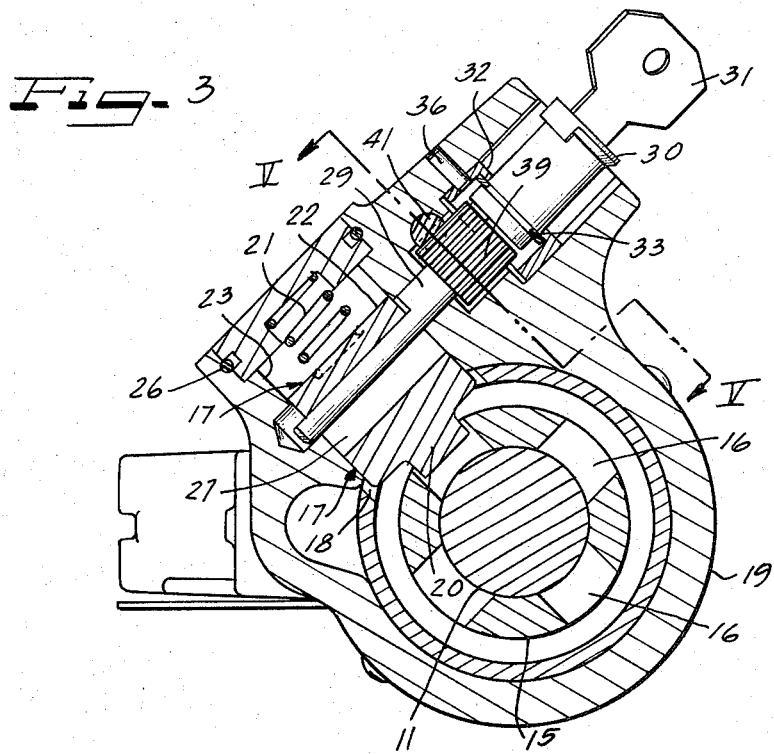
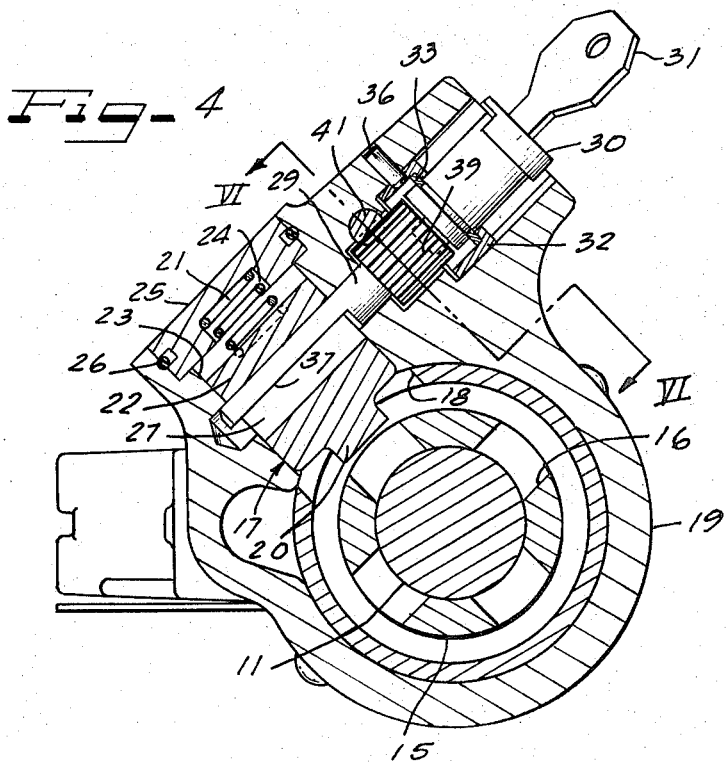

STEERING COLUMN LOCKING DEVICE

FIELD OF THE INVENTION

Anti-theft steering column and ignition lock for motor vehicles of the type found in Class 70-252.

BACKGROUND, SUMMARY AND OBJECTS OF INVENTION

Ignition and steering column locks, as anti-theft devices for motor vehicles have been known for many years and have recently come into extensive use in new cars. One such lock is shown in the U.S. Pat. to Wight et al. No. 3,490,255, dated Jan. 20, 1970 in which an interlock is provided between the transmission and the steering column lock making it necessary to move the shift lever into its park position before the steering wheel can be locked and the key can be removed. Such an interlock is considered to be necessary to satisfy safety requirements. While such locks have been satisfactory, they are only suitable for passenger cars having automatic transmissions and are not designed for locking the steering columns of trucks or cars where it is not feasible to provide an interlock between the steering wheel lock and transmission without resorting to a high cost and complicated and expensive structure.

In carrying out the present invention, an ignition and steering column lock is provided, which is particularly adapted for trucks and heavy vehicles and requires an overt act by the operator of the vehicle in addition to turning the key for the key cylinder, to position the lock into the steering column lock position, to thereby satisfy safety considerations without prpvoding a transmission interlock.

An advantage of the present invention, therefore, is that the lock of the present invention is so designed and constructed as to be particularly adapted for trucks and heavy vehicles and to require two distinct actions by the operator of the vehicle, to bring the lock into its steering column locking position.

A further advantage of the invention is that the ignition and steering column lock are both controlled by a key, and an interlock is provided to prevent turing of the key to bring the steering column lock into its lock position, which must be released by a separate action of the operator of the vehicle to enable turning of the key to lock the steering column.

A principal object of the present invention, therefore, is to provide a simplified and improved form of steering column and ignition lock particularly adapted for trucks and heavy vehicles and arranged with a view toward simplicity in construction and operation and satisfying safety requirements by the provision of a key cylinder interlock preventing turning of the key cylinder to set the steering column lock until the interlock is released as the key and key cylinder are moved into a steering column locked position.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a fragmentary transverse sectional view taken through a steering column and housing for an automotive vehicle, with certain parts broken away and parts of the housing shown in full.

FIG. 2 is a view looking down on the steering column and its housing substantially along line II—II of FIG. 1.

FIG. 3 is a sectional view taken substantially along line III—III of FIG. 1, showing the steering column in its locked position.

FIG. 4 is a sectional view like FIG. 3, and taken along the same section lines, but showing the steering column in its unlocked position.

FIG. 5 is a fragmentary sectional view taken substantially along line V—V of FIG. 3 with the steering column locked.

FIG. 6 is a fragmentary sectional view taken substantially along line VI—VI of FIG. 4 with the steering column in its unlocked position.

FIG. 7 is a fragmentary sectional view taken substantially along line VII—VII of FIG. 5 showing interlocking plunger in position to release the steering column lock.

FIG. 8 is a fragmentary sectional view taken substantially along line VIII—VIII of FIG. 6 showing the interlocking plunger in position to block movement of the steering column lock into a locking position by turning of the key; and FIG. 9 is a diagram illustrating the positions of the key and key cylinder for the various positions of the lock.

DESCRIPTION OF PREFERRED EMBODIMENT OF INVENTION

In the embodiment of the invention illustrated in FIGS. 1,2,3 and 4 of the drawings, we have generally shown a steering column 11 turned by a conventional steering wheel (not shown), for operating a steering mechanism to steer a vehicle in a conventional manner, and no part of the present invention, so not herein shown or described. The steering column 11 is journalled in a housing 12 on anti-friction axial thrust bearings 13.

A sleeve 15 is secured to said steering column 11 adjacent the upper end portion thereof for turning movement therewith. The sleeve 15 has a plurality of keeper holes 16 extending radially therethrough to be engaged by a latch bolt 17 guided for radial movement relative to the steering column 11. The latch bolt 17 extends through an opening 18 in the housing 12 into a lock casing 19 extending about the housing 12 and suitably secured thereto.

The latch bolt 17 has a reduced cross section bolt end 20 biased by a compression spring 21 to engage a keeper hole 16 in the sleeve 15, as the steering column is turned to register said bolt with a keeper hole.

The latch bolt 17 has an enlarged cross sectional area portion 22 guided in a radial guide chamber 23 in the lock casing 19 and registering with the opening 18 in the steering column housing 12. The compression spring 21 is seated in the outer end of the enlarged portion 22 of the latch bolt at one end and in a recessed portion of interior wall 24 of a cap 25 for the chamber 23 at its opposite end. The cap 25 of a flat disk-like form is recessed in an enlarged diameter portion of the chamber 23 flush with the exterior wall of the casing to prevent access to the latch bolt 17.

The enlarged portion 22 of the latch bolt has a rectangular opening 27 leading therethrough, affording a passageway for a control cam 29 turnable by turning of a key cylinder 30 by a key 31 to cam the latch bolt from its locked position shown in FIGS. 1 and 3 to its release position shown in FIG. 4 and to release the latch bolt to be moved into its locked position by the bias of the spring 21.

The key cylinder 30 carrying the tumblers of the lock is assembled in a flanged sleeve 32, the flange of which extends radially inwardly. Said key cylinder is retained to said sleeve as by a conventional spring loaded retaining ring 33. The sleeve 32 is maintained in place by pressing in a hardened pin 36.

The cam 29 is in the form of a shaft extending from the key cylinder and connected therewith to be turned by turning movement of said key cylinder. The cam 29 is rotatably carried in the lock casing 19 and extends entirely through the open portion 27 of the latch bolt and has a cylindrical face forming a continuation of the cylindrical face of the shaft and a flattened face 37 accommodating the spring 21 to engage the bolt end 20 of the latch bolt 17 with a keeper hole 16, when the cam is in the position shown in FIG. 3. Upon turning movement of the key cylinder, the flattened face will be turned to withdraw the bolt end of the latch bolt from the keeper hole 16 and the cylindrical face thereof will then cam and hold the latch bolt in its fully released position shown in FIG. 4.

The key cylinder 30 also has a pinion 39 secured thereto, which may be a part of the shaft 29. Said pinion meshes with rack teeth 40 on the underside of a rod 41. The rod 41, as shown in FIGS. 5 and 6, is guided in a drilled passageway 42 extending along the lock casing. Said rod extends downwardly from said passageway along the steering column under the dash board and in connection with an ignition switch 43.

The ignition switch 43 is diagrammatically illustrated in block form in FIG. 1 and may be a conventional form of push-pull switch in which movement of the rod 41 will close selected switch contacts for selected respective ones of the vehicle electrical circuits. As for example, turning movement of the key in a clockwise direction as shown in FIG. 9 will first connect the contacts of the ignition switch to energize the ignition and selected accessories through the battery. Further movement of the key in the same direction will connect the contacts of the ignition switch to energize the starter solenoid through the battery of the vehicle, to start the vehicle. A conventional spring return is provided when the switch is in this condition. Turning movement of the key in extreme counterclockwise direction to position 5 in FIG. 9 will connect the contacts of the ignition switch to effect energization of certain of the accessories through the battery. The contact elements of the switch and circuit making connections thereto may be conventional. The switch and its contacts, therefore, need not be further shown or described herein.

A means is provided to prevent rotation of the key 31 and key cylinder 30 in a counterclockwise direction from off position 3 shown in FIG. 9 to lock position 4 shown in this figure, except upon an overt act of the operator of the vehicle, in addition to turning of the key. Said means comprises a button 44 guided in a sleeve 45 carried in a cylindrical passageway 46 in the lock casing 19. The passageway 46 intersects the passageway 42. The button 44 has an enlarged piston-like inner end 47 engaged by a spring 48, seated within the passageway 46, and biased by said spring to extend across the portion of the passageway 42 intersected by the passageway 46 and interfere with movement of the rod 41 along said passageway.

As for example, when it is desired to rotate the key from the off position into the lock position shown in FIG. 3, the button 44 must be depressed to move the piston-like end 47 of said button out of registry with the passageway 42 and out of interfering relation with respect to the rod 41. The key can then be turned in a counterclockwise direction into its locked position 4 from its off position 3, to accommodate the spring 21 to engage the latch bolt 17 with a keeper hole 16 in said sleeve by the stored up energy of said spring, as shown in FIGS. 1 and 5. The key can then be turned to position 5 in a counterclockwise direction, to enable the radio to be turned on or other accessories to be operated. The key, however, cannot be removed from the key cylinder except when the key cylinder is in lock position 4, in position to lock the steering column from turning movement.

In operation of the lock, the key is placed in the key cylinder when said cylinder and steering column lock are in locked position 4 of FIG. 9. The key may then be freely turned to position 3. In this position, the ignition and electrical circuits are deenergized and the switch 43 is in its off position. From this position, the key is turned in a clockwise direction through position 2 into position 1 to energize the ignition and the starter solenoid to start the engine. A spring return (not shown) returns the key and key cylinder into position 2 maintaining the ignition circuit and the accessory circuit energized.

As the key 31 is turned in a clockwise direction from position 4 toward positions 3 and 2 to position 1, the rod 41 will be moved out of interfering relation with respect to the piston-like end 47 of the push button 44. The spring 48 will then move the piston-like end 47 of the push button 44 along the passageway 42 and block movement of the rod 41 and key cylinder in a counterclockwise direction, to lock the steering column, unless and until the plunger or push button 44 is again depressed to move the piston-like end 47 of said push button out of interfering relation with respect to the rod 41.

As the key cylinder is turned in a clockwise direction form position 4 to position 3, the bolt end 20 of the latch bolt will be withdrawn from a respective keeper hole 16 in the sleeve 15 against the compression spring 21 and will be maintained in this position by the cam 29 as shown in FIG. 4, during clockwise movement of the key cylinder and cam into the starting position 1.

The key, however, can only be removed when the lock is in the steering column lock position 4, and the key and key cylinder can only be moved to the steering column lock position 4 from the off position 3 by an overt act of the operator of the vehicle in addition to turning of the key, depressing the push button 44 to bring the piston-like end 47 of said push button out of interfering relation with respect to the rod 41 as shown in FIGS. 5 and 7.

We claim as our invention:
1. In a steering column and ignition lock,
a housing enclosing the steering column and forming a bearing support therefor,
a sleeve extending about the steering column and fixedly secured thereto and having a series of circumferentially spaced radially extending keeper holes leading therethrough, said steering housing having an opening leading therethrough in registry with said sleeve, a lock casing extending about said housing and having a passageway extending radially thereof in registry with said opening in said housing, a latch bolt guided in said passageway and extending to the interior of said housing and movable into and out of locking association with said sleeve, spring means biasing said latch bolt into engagement with said sleeve to come into locking engagement with a keeper hole upon turning of the steering column to register a keeper hole with said latch bolt, a key cylinder rotatably mounted in said casing, said latch bolt having a passageway leading therethrough and extending transversely thereof, a cam coaxial with the axis of said key cylinder, turnable by turning movement of said key cylinder, and extending through said passageway and having camming engagement therewith, and movable by turning movement of the key cylinder to withdraw said latch bolt from a keeper hole and unlock the steering column and to accommodate said spring means to move said latch bolt into locking engagement with a keeper hole, an ignition switch remote from said housing and key cylinder, means for operating said ignition switch comprising a rod mounted in said housing and guided for movement perpendicular to the axis of turning movement of said key cylinder, a rack and pinion drive connection between said key cylinder and rod for rectilinearly moving said rod to position said ignition switch in its various positions and to accommodate said latch bolt to move into locking relation with said sleeve, and a depressible plunger biased in position to prevent rectilinear movement of said rod and turning movement of said key cylinder to the off position of the lock, said plunger extending to the outside of said housing to accommodate depression of said plunger separate from turning movement of the key cylinder and blocking movement of said key cylinder in an on direction, except by an overt act of the operator of the vehicle in addition to turning movement of said key cylinder.

* * * * *